United States Patent
Koc (10) Patent No.: US 10,177,686 B2
(45) Date of Patent: Jan. 8, 2019

(54) PIEZOELECTRIC MOTOR

(71) Applicant: Physik Instrumente (PI) GmbH & Co. KG, Karlsruhe (DE)

(72) Inventor: Burhanettin Koc, Ettlingen (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 302 days.

(21) Appl. No.: 15/141,970

(22) Filed: Apr. 29, 2016

(65) Prior Publication Data

US 2016/0329835 A1    Nov. 10, 2016

(30) Foreign Application Priority Data

Apr. 29, 2015 (EP) .................................... 15165554

(51) Int. Cl.
*H02N 2/02* (2006.01)
*H02N 2/00* (2006.01)
*H02N 2/10* (2006.01)

(52) U.S. Cl.
CPC ............ *H02N 2/0025* (2013.01); *H02N 2/026* (2013.01); *H02N 2/103* (2013.01)

(58) Field of Classification Search
CPC ...... H02N 2/0025; H02N 2/026; H02N 2/103; H02N 2/02; H02N 2/10
USPC ........................................................ 310/328
See application file for complete search history.

(56) References Cited

U.S. PATENT DOCUMENTS

| | | | |
|---|---|---|---|
| 6,242,849 B1 * | 6/2001 | Burov | H02N 2/101 310/323.02 |
| 6,984,920 B2 | 1/2006 | Yoon et al. | |
| 7,034,439 B2 * | 4/2006 | Richter | H02N 2/101 310/311 |
| 2013/0162104 A1 | 6/2013 | Masuda et al. | |

OTHER PUBLICATIONS

"A Piezoelectric Linear Vibration Drive for High Driving Forces," T. Hemsel et al., J. of Vibroengineering, No. 1, 1999, pp. 7-12 (6 pages).
Office Action, EP Application 15165554.5, dated Oct. 30, 2015, 3 pages.

* cited by examiner

*Primary Examiner* — Derek Rosenau
(74) *Attorney, Agent, or Firm* — The Juhasz Law Firm (57) ABSTRACT

A piezoelectric motor includes at least two piezoelectric actuators. Each actuator includes two piezoelectric elements on opposite sides of a coupling element, the sides being main sides of the piezoelectric actuators and having a larger area than other surfaces or sides of the piezoelectric actuators. The main surfaces of each of the piezoelectric actuators connect with at least four side surfaces of the piezoelectric actuator. The motor includes an elastic element coupled to and spacing the first and second piezoelectric actuators from each other and there is also a frictional element that couples the first and second piezoelectric actuators for frictional contact for driving an object. The first and the second piezoelectric actuators are adapted to deform in a direction that is substantially perpendicular to a plane defined by the side surface to which the elastic element is attached using a longitudinal piezoelectric effect of the piezoelectric elements.

15 Claims, 11 Drawing Sheets

PIEZOELECTRIC MOTOR

CROSS REFERENCE TO RELATED APPLICATIONS

This application claims priority to EP Pat. Appl. 15165554, filed Apr. 29, 2015, in the European Patent Office, which is hereby incorporated by reference in its entirety.

FIELD

This invention relates to a piezoelectric motor.

BACKGROUND

U.S. Pat. No. 6,984,920 82 describes a piezoelectric motor using longitudinal mode coupling. Here, two groups of piezoelectric plates are placed in between two specifically designed elastic elements with one of them constituting a shaking beam element and with the other constituting a back support element. When both groups of piezoelectric elements are excited with two sinusoidal signals with a specified phase difference, the generated vibration is amplified by the shaking beam element and transferred to a sliding element through frictional contact. However, very precise machining and close manufacturing tolerances of the shaking beam element make it difficult to manufacture the motor at a low cost. Additionally, the vibrating portion of the motor does not have a specific nodal position to hold during operation. Also, one cannot make this motor in a slim form, since the elastic shaking beam element should have a certain length to excite a quarter wavelength of the specific frequency.

SUMMARY

Hence, this disclosure provides a piezoelectric motor that overcomes the aforementioned drawbacks of known piezoelectric motors using longitudinal mode coupling. In particular, there is a need for a piezoelectric motor using longitudinal mode coupling that can be realized easily and at low cost, and which is in addition compact in size. This task is solved by the piezoelectric motors described herein, along with the appropriate configurations and developments.

The piezoelectric motor described herein comprises at least two piezoelectric actuators, with each piezoelectric actuator comprising at least two piezoelectric elements arranged at opposite sides of a coupling element, thus sandwiching the coupling element. Each piezoelectric actuator comprises two oppositely arranged surfaces having a larger area than the other surfaces of the piezoelectric actuator and representing main surfaces, the main surfaces connected to each other by at least four side surfaces of the piezoelectric actuator. The piezoelectric actuators are arranged such that they are spaced from another, and with the piezoelectric actuators being coupled via at least one elastic element being intended for a direct or indirect frictional contact with an element to be driven. That means that the elastic element either contacts the element to be driven directly, or that between the elastic element and the element to be driven an additional (friction) element is arranged. The at least one elastic element is attached to at least a part of a side surface of one piezoelectric actuator and to at least a part of the corresponding side surface of the other piezoelectric actuator, the at least one elastic element thus bridging the space between the piezoelectric actuators. The piezoelectric actuators are intended to deform in a direction which is substantially perpendicular to the plane defined by the side surface to which the elastic element is attached by using the longitudinal piezoelectric effect of the piezoelectric elements. The former used term 'a direction which is substantially perpendicular to the plane defined by the side surface to which the elastic element is attached' means a direction which can deviate by 5% from the direction which is exactly perpendicular to the plane defined by the side surface to which the elastic element is attached. Said deviation corresponds to manufacturing tolerances.

By using the longitudinal piezoelectric effect, the larger piezoelectric material constant d33 can be used instead of the transverse piezoelectric effect with its much lower piezoelectric constant d31 as known from the state of the art.

The piezoelectric actuators are separated from each other or spaced from another, respectively, and thus being decoupled mechanically. One advantage of this decoupling is the generation of less heat during operation as the unexcited actuator vibrates, if at all, at a very low magnitude.

It may prove useful if the at least two piezoelectric elements of a piezoelectric actuator are polarized such that the corresponding polarization vectors of one piezoelectric element are arranged in opposite direction to the corresponding polarization vectors of the other piezoelectric element. Thus, the piezoelectric motor can not only operated at resonance, but also at off-resonance for fine positioning and at an extremely low speed.

It may also prove useful if the at least one elastic element covers an area of less than 50% of the whole area of each side surface of the piezoelectric actuators the elastic element is attached to.

Besides, it may prove useful if the at least one elastic element surrounds the piezoelectric actuators such that the piezoelectric actuators are pre-stressed by the surrounded elastic elements.

Furthermore, it may prove useful if at least one friction element is attached to the at least one elastic element intended for frictional contact with the element to be driven.

In addition, it may prove useful if at least one friction element protrudes through the at least one elastic element such that a force transfer can take place due to frictional coupling in between the friction element and the element to be driven.

Moreover, it may prove useful if the piezoelectric motor has two elastic elements in opposite arrangement. Thus, the vibration generated in the piezoelectric actuators will be symmetric and no or a small motion is generated at the centre which is preferably the fixing point of the vibrator element.

Further, it may prove useful if at least one elastic element is shaped as a truncated triangular prism or as a half sphere.

Likewise, it may prove useful if the coupling element has at least one arm portion for holding the piezoelectric motor, with the arm portion preferably integrally formed with the elastic coupling element.

It may prove advantageous if the at least one arm portion protrudes from a main surface of the piezoelectric actuator.

It may also prove advantageous if the at least one arm portion is arranged at the centre of the coupling element. With the centre being a nodal position and with the piezoelectric motor being held or supported by the arm portion, vibration characteristic is not affected from the holding or supporting.

Further, it may prove advantageous if each piezoelectric actuator has two arm portions in opposite arrangement.

Besides, it may prove advantageous if the piezoelectric actuators are arranged such that at least one of the main surfaces of one piezoelectric actuator is arranged parallel to the respective main surface of the other piezoelectric actuator, with the parallel arranged main surfaces preferably being arranged in the same plane.

Beyond, it may prove advantageous if the piezoelectric actuators are arranged such that at least one of the main surfaces of one piezoelectric actuator confines an angle to the respective main surface of the other piezoelectric actuator which is different from 180°.

It may prove helpful if the elastic coupling element is made from a metallic or ceramic material.

BRIEF DESCRIPTION OF THE DRAWINGS

The invention will be described in the following with reference to the appended drawings.

DETAILED DESCRIPTION OF THE DISCLOSURE

Figure 1:
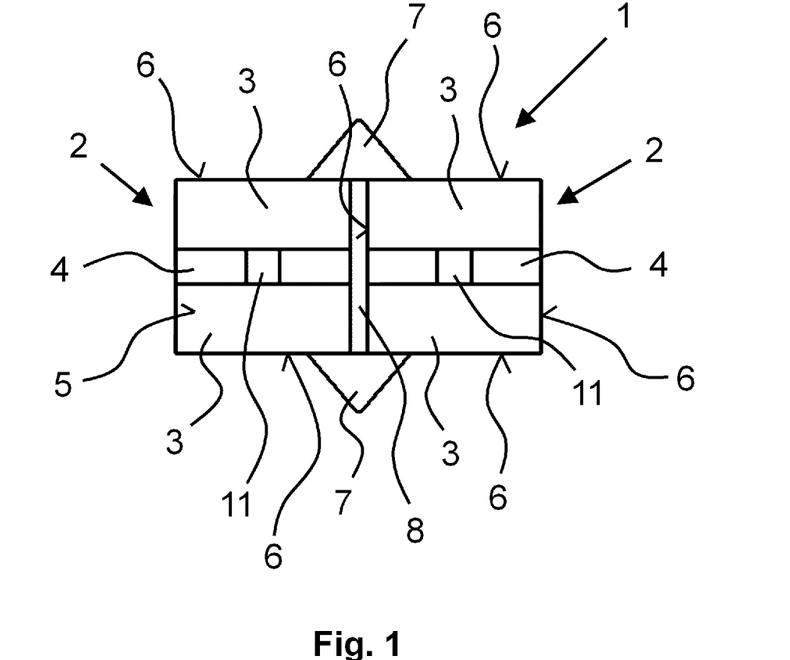
FIG. 1 shows an embodiment of the inventive piezoelectric motor in a front view.

FIG. 1 shows a possible embodiment of the inventive piezoelectric motor in a front view. The piezoelectric motor 1 comprises two piezoelectric actuators 2 being spaced from another and thus defining a space or gap 8 between them. The two piezoelectric actuators 2 have the same structure and form representing a rectangular plate with two oppositely arranged main surfaces 5 which are the biggest surfaces of the rectangular plate and with four side surfaces 6 connecting the two main surfaces. Each piezoelectric actuator comprises two piezoelectric elements 3 in opposite arrangement with a metallic coupling element 4 arranged between them and thus being sandwiched by the piezoelectric elements. The two piezoelectric elements of a piezoelectric actuator are polarized such that the corresponding polarization vectors of one piezoelectric element are arranged in opposite direction to the corresponding polarization vectors of the other piezoelectric element.

The coupling element comprises two oppositely arranged arm portions 11 (only one of them can be seen in FIG. 1) being integrally formed with the coupling element 4. Each arm portion protrudes from the respective main surface of the piezoelectric actuator and is positioned in the centre of the coupling element 4 or in the centre of the piezoelectric actuator, respectively.

The two piezoelectric actuators are coupled by two oppositely arranged elastic elements 7 having the form of a roof (which has a triangle form in profile). Each of the elastic elements 7 is attached to or connected with the respective side surface of the two juxtaposed piezoelectric actuators and thus bridging the space or gap between the piezoelectric actuators. The area of each side surface covered by the elastic element is about 25%. The elastic elements 7 are intended with its tip for a direct frictional contact with an element to be driven by the piezoelectric motor.

Figure 2:
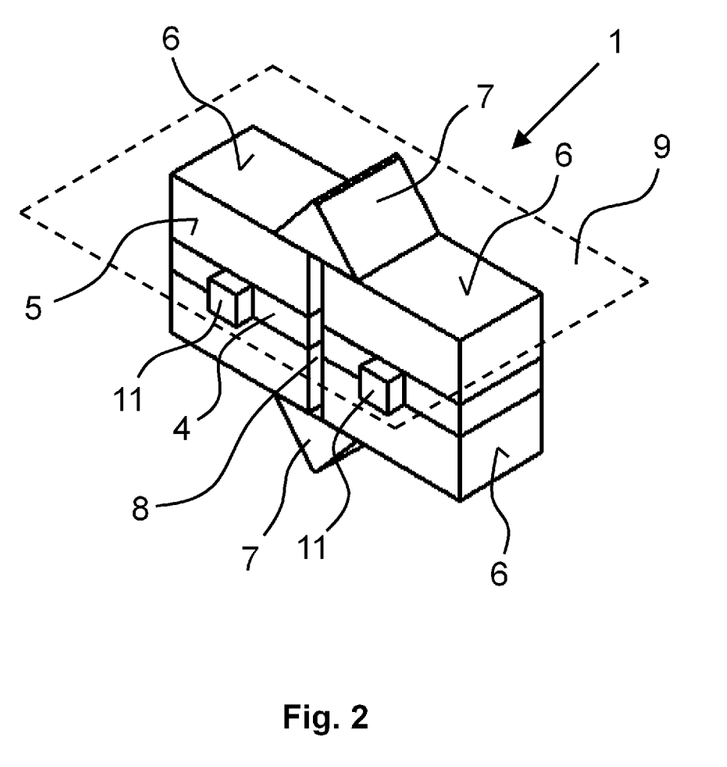
FIG. 2 shows the piezoelectric motor according to FIG. 1 in a perspective view.

FIG. 2 shows the piezoelectric motor according to FIG. 1 in a perspective view. The respective side surfaces 6 to which the elastic elements are attached are lying in the same plane 9, and the main deformation direction of each piezoelectric actuator is substantially arranged perpendicular to the plane 9.

Figure 3A:
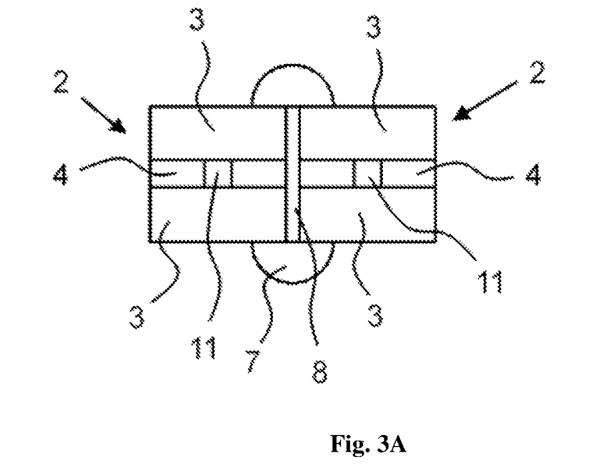
FIG. 3A shows another embodiment of the inventive piezoelectric motor in a front view.
Figure 3B:
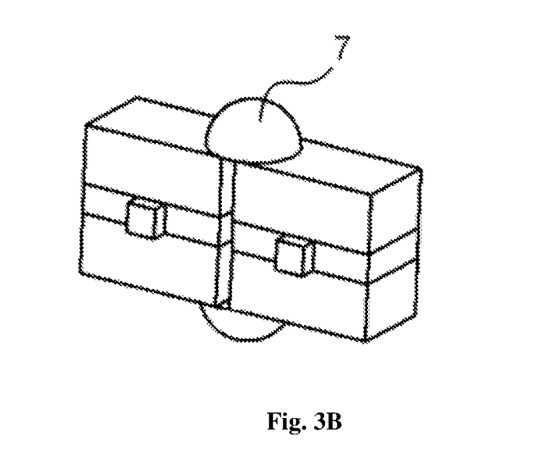
FIG. 3B shows the piezoelectric motor according to FIG. 3A in a perspective view.

FIG. 3A shows a further embodiment of the inventive piezoelectric motor in a front view, while FIG. 3B shows the motor according to FIG. 3A in a perspective view. The only difference to the piezoelectric motor according to FIGS. 1 and 2 is the form of the elastic elements 7 which represents the half of a sphere.

Figure 4A:
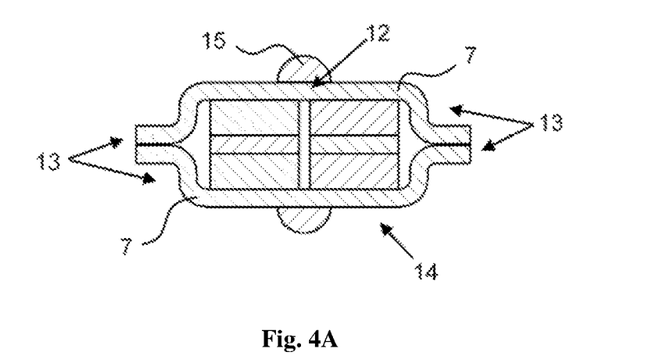
FIG. 4A shows a further embodiment of the inventive piezoelectric motor in a front view.
Figure 4B:
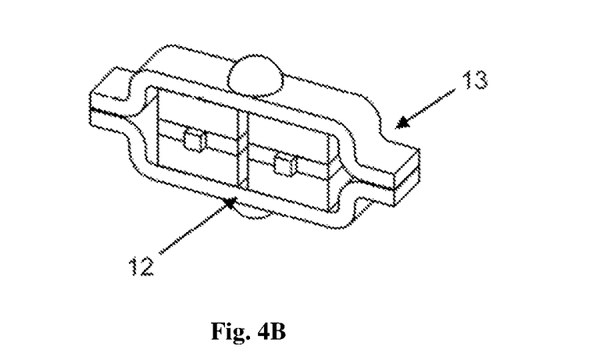
FIG. 4B shows the piezoelectric motor according to FIG. 4A in a perspective view.

FIG. 4A shows a further embodiment of the inventive piezoelectric motor in a front view, while FIG. 4B shows the motor according to FIG. 4A in a perspective view. Here, the piezoelectric motor comprises two metallic elastic elements 7 which together completely surround the two piezoelectric actuators with respect to their side surfaces. Each of the elastic elements is attached to or connected with the whole area of two juxtaposed side surfaces 6 and has a portion 12 bridging the space or gap 8 of the juxtaposed piezoelectric actuators. Furthermore, each of the elastic elements has two S-shaped portions 13 with the respective S-shaped portions of different elastic elements being connected, thus creating a closed housing 14 for the piezoelectric actuators. This housing 14 is able to apply a compressive force on each piezoelectric actuator which is especially advantageous when using piezoelectric actuators comprising many layers of piezoelectric material and with corresponding electric layers between adjacent piezoelectric material layers (so-called multilayer piezoelectric actuator), as with such multilayer actuators there exists the danger of layer pilling off during operation.

The aforementioned metallic elastic elements 7 having a plane portion and S-shaped portions 13 building up a housing 14 for the piezoelectric actuators can be realized from plane elastic elements firstly brought into contact with the side surfaces of the piezoelectric actuators and with their end portions then deformed such that the end portions of different elastic elements contact each other. While the end portions of the elastic elements are deformed with a corresponding pressure, a compressing pressure on the piezoelectric actuators is generated when said end portions of different elastic elements are bonded or welded.

To each of the metallic elastic elements 7, a friction element 15 is attached, with the friction elements positioned in an opposite and symmetric arrangement. The friction elements 15 are glued to the surface of the respective metallic elastic element 7. However, it is also possible that the friction elements are connected or bonded to the respective side surfaces of the piezoelectric actuators and that they protrude through a corresponding opening in the elastic element.

It is possible that the electrical contacting of the piezoelectric actuators is realized by the elastic elements serving as the common terminal, and with the coupling element 4 serving as the active terminal.

Figure 5A:
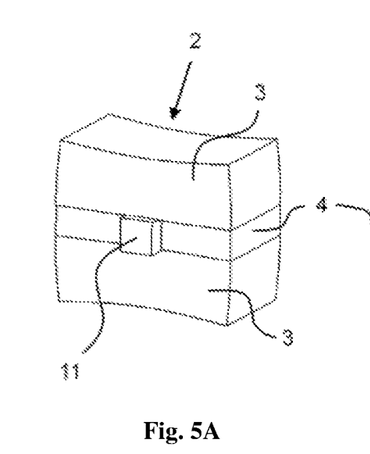
FIG. 5A shows a phase of a calculated maximum deformation of a piezoelectric actuator of an inventive piezoelectric motor.
Figure 5B:
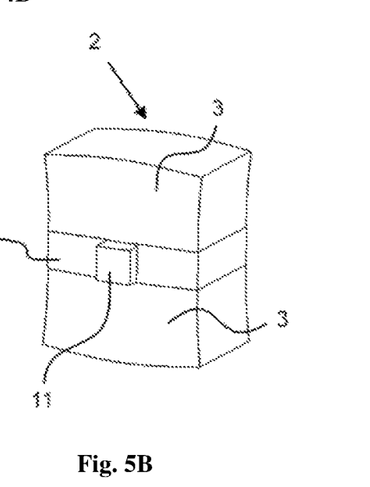
FIG. 5B shows another phase of a calculated maximum deformation of said piezoelectric actuator.

FIG. 5A shows a phase of a calculated maximum deformation of a piezoelectric actuator of an inventive piezoelectric motor, and FIG. 5B shows another phase of a calculated maximum deformation of said piezoelectric actuator. The arm portion 11 which is positioned in the centre of the piezoelectric actuator nearly does not change its position with respect to both maximum deformation phases and thus is best suited for holding the piezoelectric actuators or the piezoelectric motor, respectively.

Figure 6A:
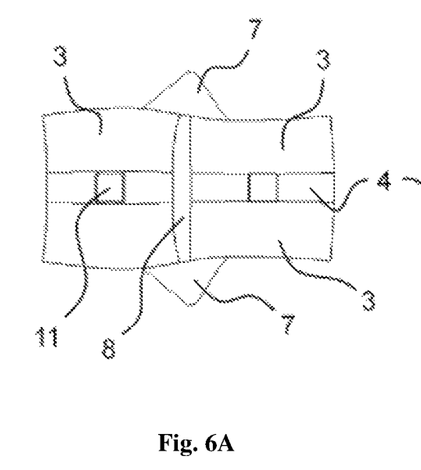
FIG. 6A shows a phase of a calculated deformation of the piezoelectric motor with one of the piezoelectric actuators being deformed according to FIG. 5A.
Figure 6B:
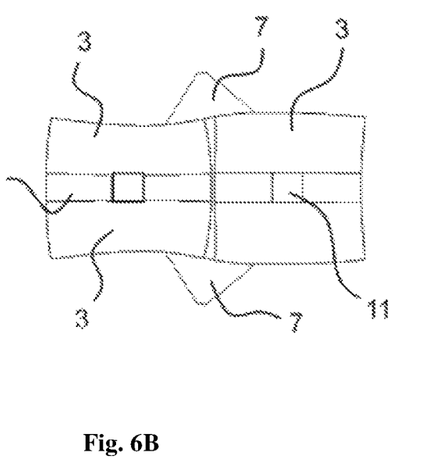
FIG. 6B shows a phase of a calculated deformation of the piezoelectric motor with one of the piezoelectric actuators being deformed according to FIG. 5(*b*).

FIG. 6A shows a phase of a calculated deformation of the piezoelectric motor with one of the piezoelectric actuators being deformed according to FIG. 5A, while FIG. 6B shows a phase of a calculated deformation of the piezoelectric motor with the same of the piezoelectric actuators being deformed according to FIG. 5B. Here, only one of the two piezoelectric actuators is electrically excited (in FIGS. 6A-6B the left piezoelectric actuator) at its resonance frequency, while the other piezoelectric actuator remains unexcited.

Figure 7:
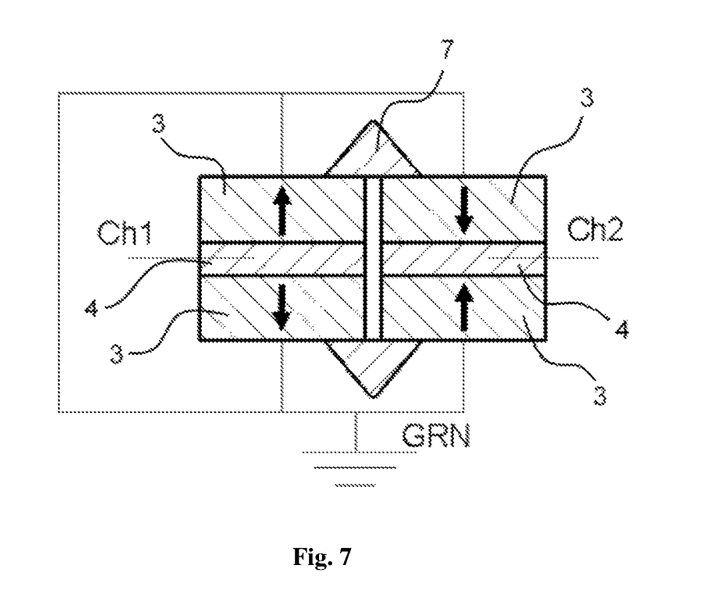
FIG. 7 shows a functional block diagram as regards the electrical excitation of the piezoelectric motor according to FIGS. 6A-6B.

FIG. 7 shows a functional block diagram as regards the electrical excitation of the piezoelectric motor according to FIGS. 6A-6B. While all piezoelectric elements are connected to the ground terminal, either the coupling element 4 of the first piezoelectric actuator (designated as CM in FIG. 7) is connected to an excitation voltage, or the coupling element 4 of the second piezoelectric actuator (designated as Ch2 in FIG. 7) is connected to an excitation voltage.

FIG. 7 also shows (with corresponding arrows) the polarization directions of the piezoelectric material of the piezoelectric elements. While the polarization directions of the oppositely arranged piezoelectric elements of the first (left) piezoelectric actuator are averted with respect to each other, the polarization directions of the oppositely arranged piezoelectric elements of the second (right) piezoelectric actuator are facing each other. In both cases, the polarization directions of the different piezoelectric elements of one piezoelectric actuator are parallel to each other.

Figure 8A:
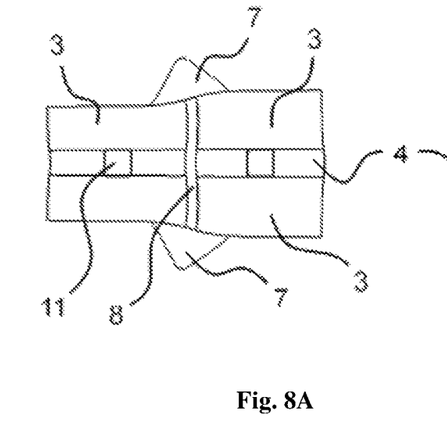
FIG. 8A shows a phase of a calculated deformation of an inventive piezoelectric motor with both piezoelectric actuators excited.
Figure 8B:
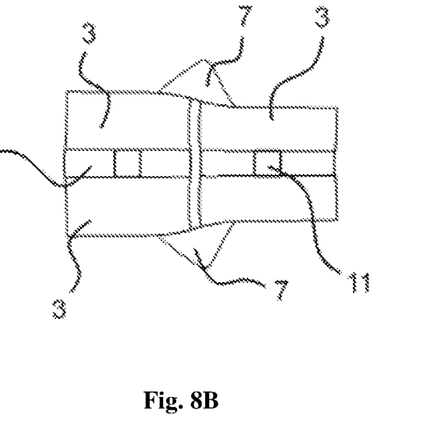
FIG. 8B shows another phase of a calculated deformation of the same piezoelectric motor.

FIG. 8A shows a phase of a calculated maximum deformation of an inventive piezoelectric motor with both piezoelectric actuators excited, and FIG. 8B shows another phase of a calculated maximum deformation of the same piezoelectric motor.

Figure 9:
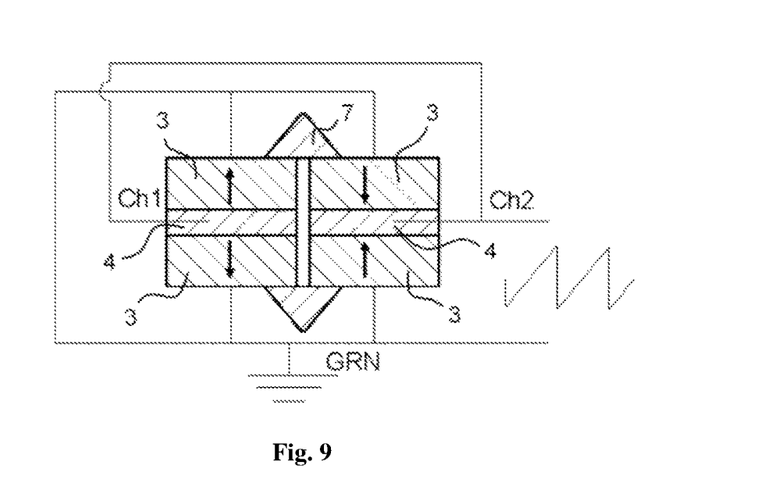
FIG. 9 shows a functional block diagram as regards the electrical excitation of the piezoelectric motor according to FIGS. 8A-8B.

FIG. 9 shows a functional block diagram as regards the electrical excitation of the piezoelectric motor according to FIGS. 8A-8B. Again, all piezoelectric elements are connected to ground, while the coupling element 4 of each piezoelectric actuator is connected to a sawtooth-shaped driving voltage, which causes the motor to be operated according to inertia principal. If there exist is a speed difference in between back and forth motions on the elastic elements 7 or the friction elements 15, a net motion of the element to be driven can be obtained. When the coupling element 4 of each piezoelectric actuator is connected to a triangular signal, extremely small speed can be obtained. Since an element to be driven is in contact to either the elastic elements 7 or the friction elements 15, deformation on the elastic elements 7 or friction elements 15 as seen in FIG. 8 can make the element to be driven to be also moved at a small distance.

Figure 10A:
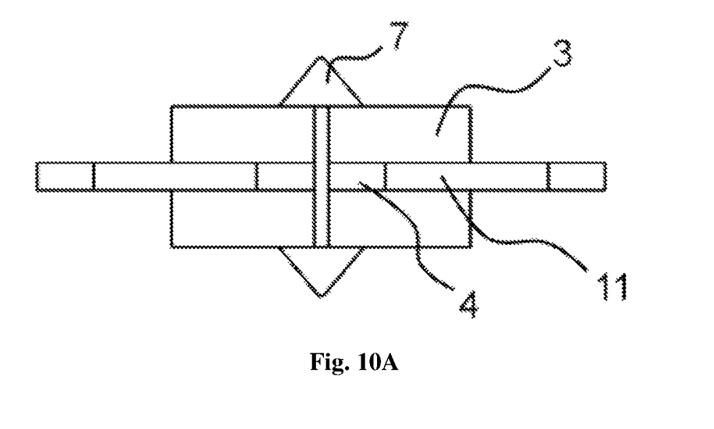
FIG. 10A shows a further embodiment of the inventive motor.
Figure 10B:
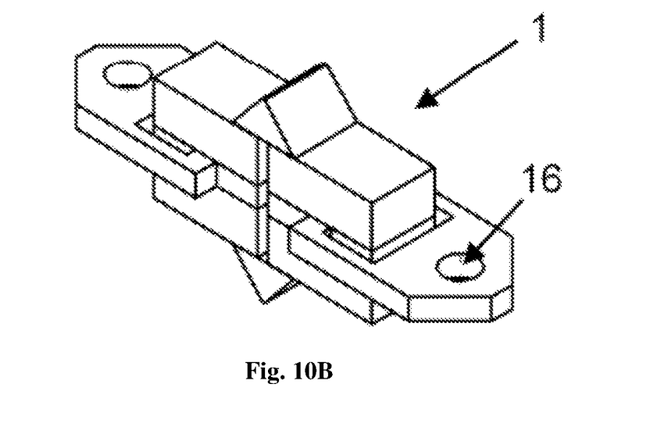
FIG. 10B shows the piezoelectric motor according to FIG. 10A in a perspective view.

FIG. 10A shows a further embodiment of the inventive motor, and FIG. 10B shows the piezoelectric motor according to FIG. 10A in a perspective view. Each arm portion 11 of the respective coupling portion 4 of this embodiment is formed such that it surrounds the coupling portion 4 or the piezoelectric actuator, respectively, like a clamp. The arm portion is integrally formed with the coupling portion which is made from a metallic material. The arm portion has an opening 16 which is intended for fixation of the piezoelectric motor via e.g. a bolt. Apart from the different arm portion, the piezoelectric motor according to FIGS. 10A-10B is equal to the piezoelectric motor according to FIGS. 1 and 2.

Figure 11A:
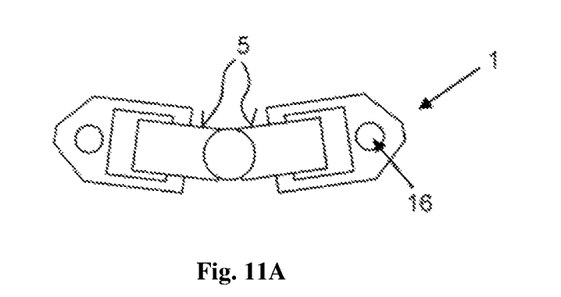
FIG. 11A shows a further embodiment of the inventive piezoelectric motor.
Figure 11B:
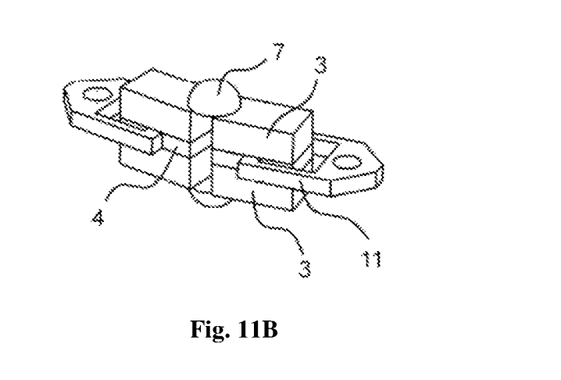
FIG. 11B shows the piezoelectric motor according to FIG. 11A in a perspective view.

FIG. 11A shows a further embodiment of the inventive piezoelectric motor, and FIG. 11B shows the piezoelectric motor according to FIG. 11A in a perspective view. Here, the piezoelectric actuators 2 are arranged such that each of the main surfaces 5 of one piezoelectric actuator confines an angle to the respective main surface of the other piezoelectric actuator which is different from 180°, where for two respective and juxtaposed main surfaces 5 the angle is smaller than 180° and for the other two respective and juxtaposed main surfaces 5 the angle is larger than 180°. Besides, the piezoelectric motor according to FIGS. 11A-11B has the same arm portions 11 as the piezoelectric motor according to FIGS. 10A-10B. Apart from the different arrangement of the two piezoelectric actuators confining an angle between them which is other than 180° and the different arm portions, the piezoelectric motor according to FIGS. 11A-11B is equal to the piezoelectric motor according to FIGS. 3A-3B.

Figure 12A:
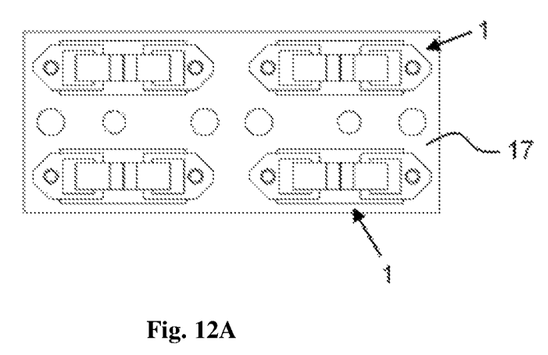
FIGS. 12A-12B depict an application of the inventive piezoelectric motor according to FIGS. 10A-10B.
Figure 12B:
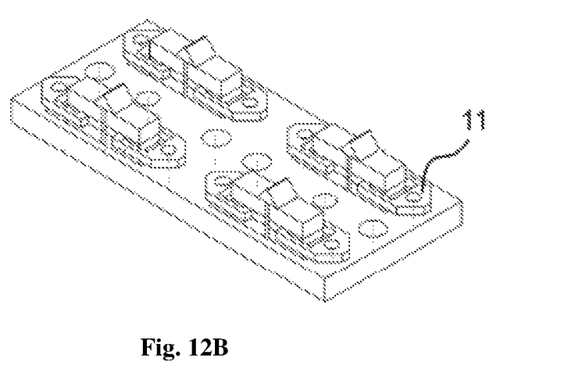

FIG. 12A shows an application of the inventive piezoelectric motor according to FIG. 10 in a top view, where FIG. 12B shows the same application in a perspective view. Here, four piezoelectric motors 1 are arranged on a base plate 17 via the arm portions 11. A screw (not shown in FIGS. 12A-12B) protrudes through each of the openings 16 of the arm portions 11, and is screwed into the base plate 17. With this application, a linear movement of an element to be driven by the piezoelectric motors is feasible.

Figure 13A:
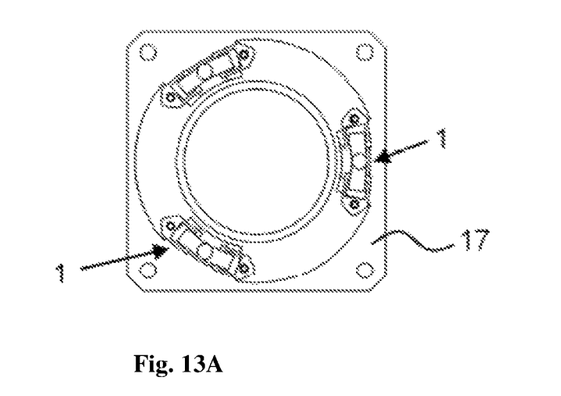
FIGS. 13A-13B depict an application of the inventive piezoelectric motor according to FIGS. 11A-11B.
Figure 13B:
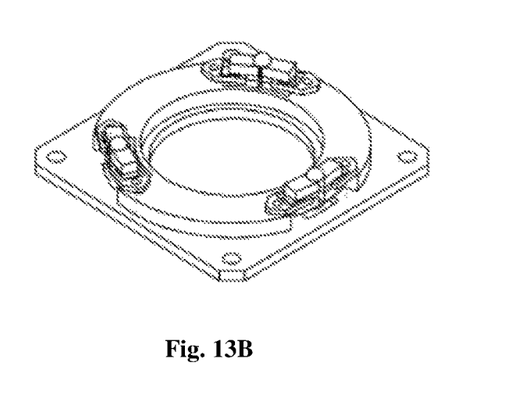

FIG. 13A shows an application of the inventive piezoelectric motor according to FIG. 11 in a top view, where FIG. 13B shows the same application in a perspective view. Here, three piezoelectric motors 1 are arranged approximately equally spaced along a circle path. Each piezoelectric motor is fixed to the base plate 17 via its arm portions 11, where a screw (not shown in FIGS. 13A-13B) protrudes through each of the openings 16 of the arm portions and is screwed into the base plate 17. With this application, a rotational movement of an element to be driven by the piezoelectric motors is feasible.

Figure 14A:
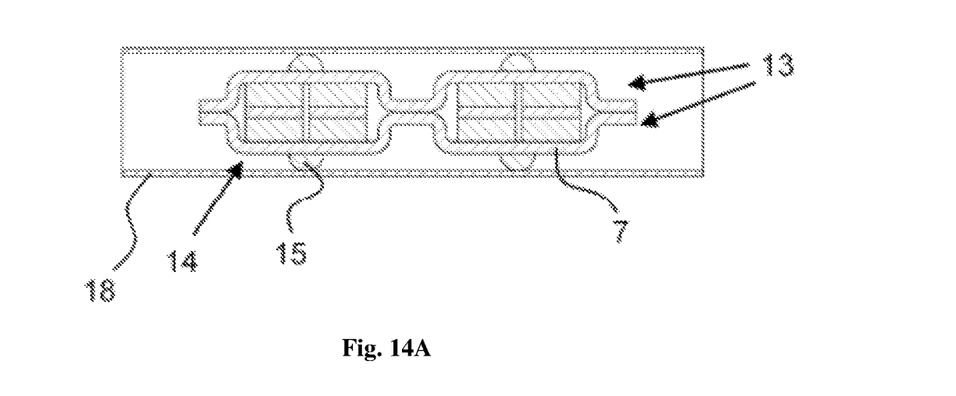
FIGS. 14A-14B-14C depict an application of the inventive piezoelectric motor according to FIG. 4.
Figure 14B:
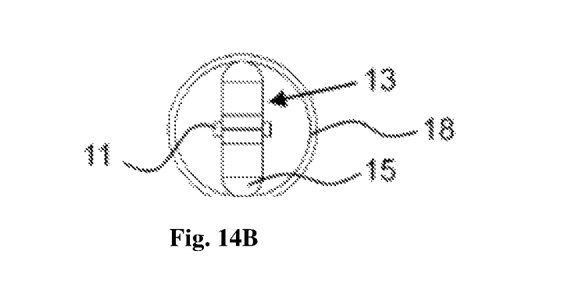
Figure 14C:
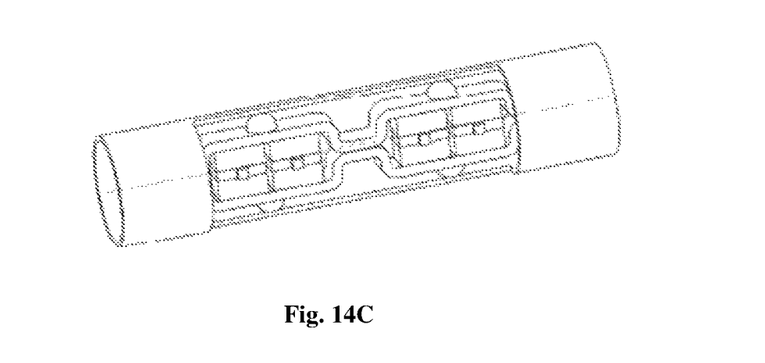

FIG. 14A shows a possible application of the inventive piezoelectric motor according to FIG. 4 in a cross-sectional view, where FIG. 14B and FIG. 14C show the same application in a top (FIG. 14B) or perspective (FIG. 14C) view, respectively. The piezoelectric motor is similar to the piezoelectric motor according to FIG. 4, but here two metallic elastic elements 7 surround in total four piezoelectric actuators with the respective two of the piezoelectric actuators forming a unit of the piezoelectric motor. The two metallic elastic elements 7 such form the housing 14, with each of the metallic elastic elements 7 having several S-shaped portions 13 at which the two metallic elastic elements 7 are connected. To each of the metallic elastic elements 7, two friction elements 15 are attached, with the respective two friction elements positioned in an opposite and symmetric arrangement. The friction elements 15 are glued to the surface of the respective elastic element 7. However, it is also possible that the friction elements are connected or bonded to the respective side surfaces of the piezoelectric actuators and that they protrude through a corresponding opening in the elastic element.

The resulting motor is inserted in a thin walled elastic cylinder 18. In this configuration, either the piezoelectric motor is fixed and the thin walled cylinder constitutes the element to be driven, or the cylinder is fixed and the motor is the moving element. Placing the piezoelectric motor inside a cylindrical structure has the advantage that the friction elements 15 on both sides are in contact with a corresponding friction surface (wall of the cylinder), what can be beneficial for higher force generation. Since the shape of the friction elements corresponds to a half sphere, the deformations of the piezoelectric motor will deform the thin walled cylinder and the piezoelectric motor will stay at the centre of the cylinder without a need of guide element. Deformation of the cylinder creates also pre-stress on the piezoelectric actuators.

What is claimed is:

1. A piezoelectric motor, comprising:
   at least a first and a second piezoelectric actuator, each piezoelectric actuator comprising:
   a coupling element;
   at least two piezoelectric elements arranged on opposite sides of the coupling element, each piezoelectric actuator comprising two oppositely-arranged surfaces having a larger area than other surfaces of the piezoelectric actuator and the two oppositely-arranged surfaces representing main surfaces connected to each other by at least four side surfaces of the piezoelectric actuator; and
   at least one elastic element coupled to and spacing the first and second piezoelectric actuators from each other, the piezoelectric actuators coupled for direct or indirect frictional contact for driving an element,
   wherein the elastic element is attached to at least a part of a side surface of the first piezoelectric actuator and to at least a part of a corresponding side surface of the second piezoelectric actuator, the at least one elastic element bridging a space between the first and second piezoelectric actuators, and
   wherein the first and the second piezoelectric actuators are adapted to deform in a direction that is substantially perpendicular to a plane defined by the side surface to which the elastic element is attached by using a longitudinal piezoelectric effect of the at least two piezoelectric elements.

2. The piezoelectric motor of claim 1, wherein the at least two piezoelectric elements of each of the first and second piezoelectric actuators are polarized such that polarization vectors of one of the piezoelectric elements are arranged in an opposite direction to polarization vectors of the other of the two piezoelectric elements.

3. The piezoelectric motor of claim 1, wherein the at least one elastic element covers an area less than 50% of a side surface of the piezoelectric actuator to which the at least one elastic element is attached.

4. The piezoelectric motor of claim 1, wherein the at least one elastic element surrounds at least three sides of each of the first and second piezoelectric actuators.

5. The piezoelectric motor of claim 1, further comprising at least one friction element attached to the at least one elastic element for frictional contact for driving the friction element.

6. The piezoelectric motor of claim 1, further comprising at least one friction element protruding through the at least one elastic element.

7. The piezoelectric motor of claim 1, wherein the at least one elastic element comprises at least two elastic elements arranged on opposite sides of the piezoelectric motor.

8. The piezoelectric motor of claim 1, wherein the at least one elastic element has a general shape of a truncated triangular prism or a half sphere.

9. The piezoelectric motor of claim 1, wherein the coupling element has at least one arm portion for holding the piezoelectric motor, the arm portion integrally formed with the coupling element.

10. The piezoelectric motor of claim 9, wherein the at least one arm portion protrudes from a surface of the first or the second piezoelectric actuator.

11. The piezoelectric motor of claim 9, wherein the at least one arm portion is arranged at a center of the coupling element.

12. The piezoelectric motor of claim 9, wherein each of the first and second piezoelectric actuators has two arm portions in opposite orientations.

13. The piezoelectric motor of claim 1, wherein the first and second piezoelectric actuators are arranged so that least one surface of the first piezoelectric actuator is parallel to a corresponding surface of the second piezoelectric actuator and the at least one surface of the first piezoelectric actuator and the corresponding surface of the second piezoelectric actuator are substantially in a same plane.

14. The piezoelectric motor of claim 1, wherein at least one surface of the first piezoelectric actuator is joined to a corresponding at least one surface of the second piezoelectric actuator at an angle different from 180 degrees.

15. The piezoelectric motor of claim 1, wherein the elastic coupling element is made from a metallic or ceramic material.

* * * * *